United States Patent
Nguyen

(10) Patent No.: US 12,443,389 B1
(45) Date of Patent: Oct. 14, 2025

(54) INTELLIGENT MUTING AND UNMUTING OF AN AUDIO FEED WITHIN A COMMUNICATION SESSION

(71) Applicant: Zoom Communications, Inc., San Jose, CA (US)

(72) Inventor: Thanh Le Nguyen, Belle Chasse, LA (US)

(73) Assignee: Zoom Communications, Inc., San Jose, CA (US)

(*) Notice: Subject to any disclaimer, the term of this patent is extended or adjusted under 35 U.S.C. 154(b) by 174 days.

(21) Appl. No.: 18/316,055

(22) Filed: May 11, 2023

Related U.S. Application Data

(63) Continuation of application No. 17/573,454, filed on Jan. 11, 2022, now abandoned.

(51) Int. Cl.
| | |
|---|---|
| *G06F 3/0487* | (2013.01) |
| *G06F 3/16* | (2006.01) |
| *G10L 17/04* | (2013.01) |
| *G10L 17/24* | (2013.01) |
| *G10L 25/78* | (2013.01) |
| *H04L 65/403* | (2022.01) |
| *G06N 20/00* | (2019.01) |

(52) U.S. Cl.
CPC .............. *G06F 3/165* (2013.01); *G10L 17/04* (2013.01); *G10L 17/24* (2013.01); *G10L 25/78* (2013.01); *H04L 65/403* (2013.01); *G06N 20/00* (2019.01)

(58) Field of Classification Search
CPC . G06F 3/165; G06F 3/167; G06F 3/20; G06F 21/84; G06F 3/04847; G06F 3/0487; G06N 20/00; G06V 10/77; G06V 40/165; G06V 10/993; G06V 40/172; G06V 40/174; G10K 11/17885; G10K 11/17873; G10L 15/22; G10L 17/04; G10L 17/18; G10L 17/22; G10L 17/24; G10L 25/51; G10L 25/60; G10L 25/78; H03G 3/342; H04L 12/1818; H04L 12/1827; H04L 65/1093; H04L 65/4015; H04L 65/403; H04L 65/1069; H04W 64/00; G01C 21/3807; G06T 17/20; H04M 7/0027; H04N 21/4223

See application file for complete search history.

(56) References Cited

U.S. PATENT DOCUMENTS

| | | | |
|---|---|---|---|
| 11,176,923 B1* | 11/2021 | Vendrow | G10K 11/17873 |
| 11,297,281 B1* | 4/2022 | Agrawal | G10L 17/22 |

(Continued)

*Primary Examiner* — Gerald Gauthier
(74) *Attorney, Agent, or Firm* — Young Basile Hanlon & MacFarlane, P.C.

(57) ABSTRACT

An input audio signal is received from a client device. A connection to a communication session with a plurality of participants is maintained for the client device. An audio feed corresponding to the input audio signal is transmitted to a plurality of other participant devices. While the communication session is in progress and the connection to the communication session is maintained by the client device, the following are periodically performed. An absence of audible speech originating at the client device within the input audio signal is detected. The audio feed transmitted to the plurality of other participant devices is muted. The input audio signal is analyzed for audible speech. A presence of audible speech within the input audio signal is detected. The audio feed transmitted to the plurality of other participant devices is unmuted.

20 Claims, 6 Drawing Sheets

(56) References Cited

U.S. PATENT DOCUMENTS

| | | | | |
|---|---|---|---|---|
| 11,489,895 B1* | 11/2022 | Fardig | G10L 15/22 | |
| 11,620,041 B1* | 4/2023 | Boucheron | G06F 3/04847 | |
| | | | 715/758 | |
| 11,812,194 B1* | 11/2023 | Vandyke | G06F 3/167 | |
| 2018/0124458 A1* | 5/2018 | Knox | H04N 21/4223 | |
| 2018/0124459 A1* | 5/2018 | Knox | G06V 40/174 | |
| 2018/0349086 A1* | 12/2018 | Chakra | H04W 64/00 | |
| 2020/0103963 A1* | 4/2020 | Kelly | G06F 3/0487 | |
| 2020/0110572 A1* | 4/2020 | Lenke | G06F 3/167 | |
| 2020/0274911 A1* | 8/2020 | Gargaro | G10L 25/60 | |
| 2020/0326846 A1* | 10/2020 | Leong | H04M 7/0027 | |
| 2021/0051035 A1* | 2/2021 | Atkins | H04L 12/1827 | |
| 2021/0051036 A1* | 2/2021 | Atkins | H04L 65/403 | |
| 2021/0051037 A1* | 2/2021 | Atkins | G06V 10/993 | |
| 2021/0383824 A1* | 12/2021 | Condorelli | H03G 3/342 | |
| 2021/0392175 A1* | 12/2021 | Gronau | G06T 17/20 | |
| 2021/0392231 A1* | 12/2021 | Gronau | H04L 12/1827 | |
| 2021/0399911 A1* | 12/2021 | Jorasch | H04L 12/1818 | |
| 2021/0400142 A1* | 12/2021 | Jorasch | H04L 65/1069 | |
| 2022/0036708 A1* | 2/2022 | Rey | G06F 21/84 | |
| 2022/0051412 A1* | 2/2022 | Gronau | G06V 40/172 | |
| 2022/0051652 A1* | 2/2022 | Winsvold | G10K 11/17885 | |
| 2022/0139383 A1* | 5/2022 | Rose | H04L 12/1827 | |
| | | | 704/232 | |
| 2022/0182578 A1* | 6/2022 | Sircar | G06V 40/165 | |
| 2022/0198388 A1* | 6/2022 | Simpson | G01C 21/3807 | |
| 2022/0345501 A1* | 10/2022 | Li | H04L 65/403 | |
| 2022/0377117 A1* | 11/2022 | Xi | H04L 12/1818 | |
| 2022/0413794 A1* | 12/2022 | Qiao | H04L 65/403 | |
| 2023/0007056 A1* | 1/2023 | Cox | H04L 65/4015 | |
| 2023/0038109 A1* | 2/2023 | Braganza | G10L 25/51 | |
| 2023/0077283 A1* | 3/2023 | Mehta | G10L 17/18 | |
| 2023/0090613 A1* | 3/2023 | Covell | H04L 65/1093 | |
| | | | 709/204 | |
| 2023/0133539 A1* | 5/2023 | Sieracki | H04L 65/403 | |
| | | | 709/204 | |
| 2025/0088795 A1* | 3/2025 | Graham | G06V 10/77 | |

\* cited by examiner

INTELLIGENT MUTING AND UNMUTING OF AN AUDIO FEED WITHIN A COMMUNICATION SESSION

CROSS REFERENCES TO OTHER APPLICATIONS

This application is a continuation of U.S. patent application Ser. No. 17/573,454, filed on Jan. 11, 2022, the entire disclosure of which is incorporated herein by reference.

FIELD

The present invention relates generally to digital media, and more particularly, to systems and methods for providing intelligent muting and unmuting of an audio feed within a communication session.

SUMMARY

The appended claims may serve as a summary of this application.

BRIEF DESCRIPTION OF THE DRAWINGS

The present disclosure will become better understood from the detailed description and the drawings, wherein.

DETAILED DESCRIPTION

Figure 1A:
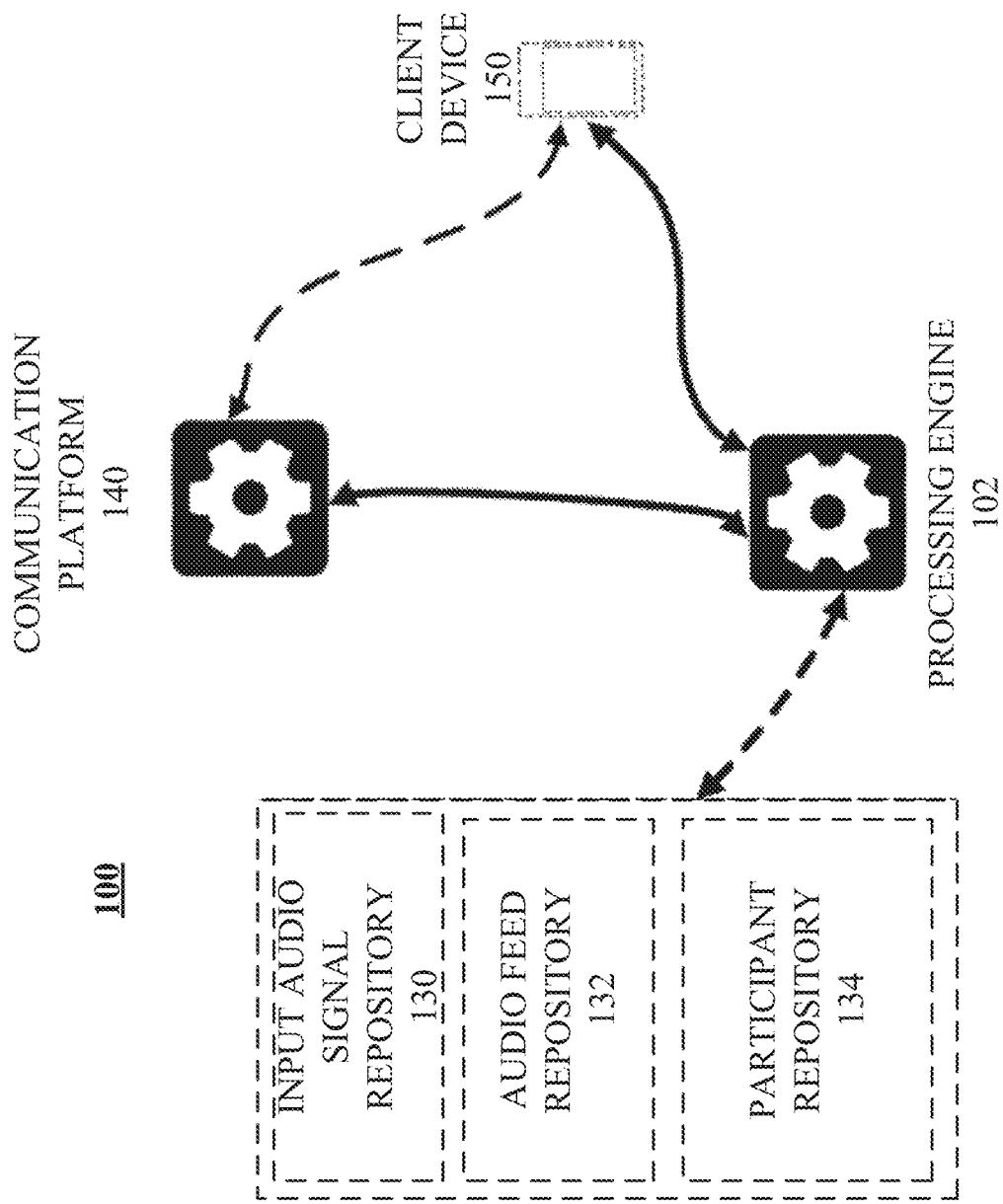
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adoption of use of communication platforms allowing for remote video and/or audio sessions between multiple participants. Communications applications for casual friendly conversation ("chat"), webinars, large group meetings, work meetings or gatherings, asynchronous work or personal conversation, and more have exploded in popularity. Within such communication sessions, the audio feeds of participants are typically transmitted to other participants, and participants have the ability to "mute" and "unmute" their own audio feed, i.e., render silent and render audible for other participants, respectively. It is generally considered to be good etiquette within remote meetings to mute oneself when not speaking. Among other reasons, this is so as to not produce unwanted noise or distractions for others wanting to hear participants who are speaking, as well as to prevent the possibility of conversations from oneself or others in one's room from being inadvertently heard by others.

Currently, users of remote communications platforms often find the practice of muting and unmuting themselves to be unsatisfactory and frustrating. Many find themselves fumbling with user interface (hereinafter "UI") elements on their device's screen slowly and awkwardly to click, tap, or otherwise interact with a "Mute"/"Unmute" button. Time spent manually doing so is time in which a user is not able to multitask on other matters they must attend to. Users on mobile devices find muting to be cumbersome, as in most cases they must hold their mobile device out in front of them with the screen turned on in case they must suddenly mute or unmute themselves. Handicapped users may also have difficulty activating physical buttons. In some cases, a user may be able to press a physical button on a phone, speaker device, or other external device to mute or unmute, but this still imposes a requirement to manually do so. In all such cases, a user cannot use the service without physically using their hands to mute and unmute. Additionally, it is often the case that the issue of whether participants have properly muted or unmuted themselves can be very disruptive in meetings, as it is common for participants to inadvertently fail to mute themselves or unmute themselves. In the first instance participants may hear unwanted noise or conversations from the participant or people physically near to the participant, while in the second instance participants may fail to hear someone who is speaking, and the issue is not addressed until, e.g., the speaker realizes they have been on mute and proceeds to manually unmute their audio feed.

Thus, there is a need in the field of digital communication tools and platforms to create new and useful systems and methods for providing intelligent muting and unmuting of participants within a communication session, such that background noise and conversations will be kept to a minimum, participants would be able to participate in meetings without needing to use their hands to manually mute and unmute themselves, and meetings will run smoother with less distractions. The inventors have identified an absence in the current field of art of the ability to provide intelligent detection of when a user is audibly speaking or is silent within their respective audio feed, and automatically muting or unmuting based on this detection.

In one embodiment, the system receives an input audio signal from a client device, and maintains, for a participant connected to the client device, a connection to a communication session with a plurality of participants, where an audio feed of the participant corresponding to the input audio signal is transmitted to a plurality of other participants. The system then periodically performs, while the session is in progress and the connection to the session is maintained by the client device, the following steps sequentially, concurrently, or partly concurrently: detecting that the participant is not audibly speaking within the input audio signal; muting the audio feed transmitted to the plurality of other participants; analyzing the input audio signal for audible speech from the participant; detecting that the participant is audibly speaking within the input audio signal; and unmuting the audio feed transmitted to the plurality of other participants.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a user's client device is connected to a processing engine 102 and, optionally, a communication platform 140. The processing engine 102 is connected to the communication platform 140, and optionally connected to one or more repositories and/or databases, including an input audio signal repository 130, audio feed repository 132, and/or a participant repository 134. One or more of the databases may be combined or split into multiple databases. The client device 150 of the user in this environment may be a computer, and the communication platform 140 and processing engine 102 may be applications or software hosted on a computer or multiple computers which are communicatively coupled via remote server or locally.

The exemplary environment 100 is illustrated with only one user's client device, one processing engine, and one communication platform, though in practice there may be more or fewer client devices, processing engines, and/or communication platforms. In some embodiments, the client device, processing engine, and/or communication platform may be part of the same computer or device.

Figure 2:
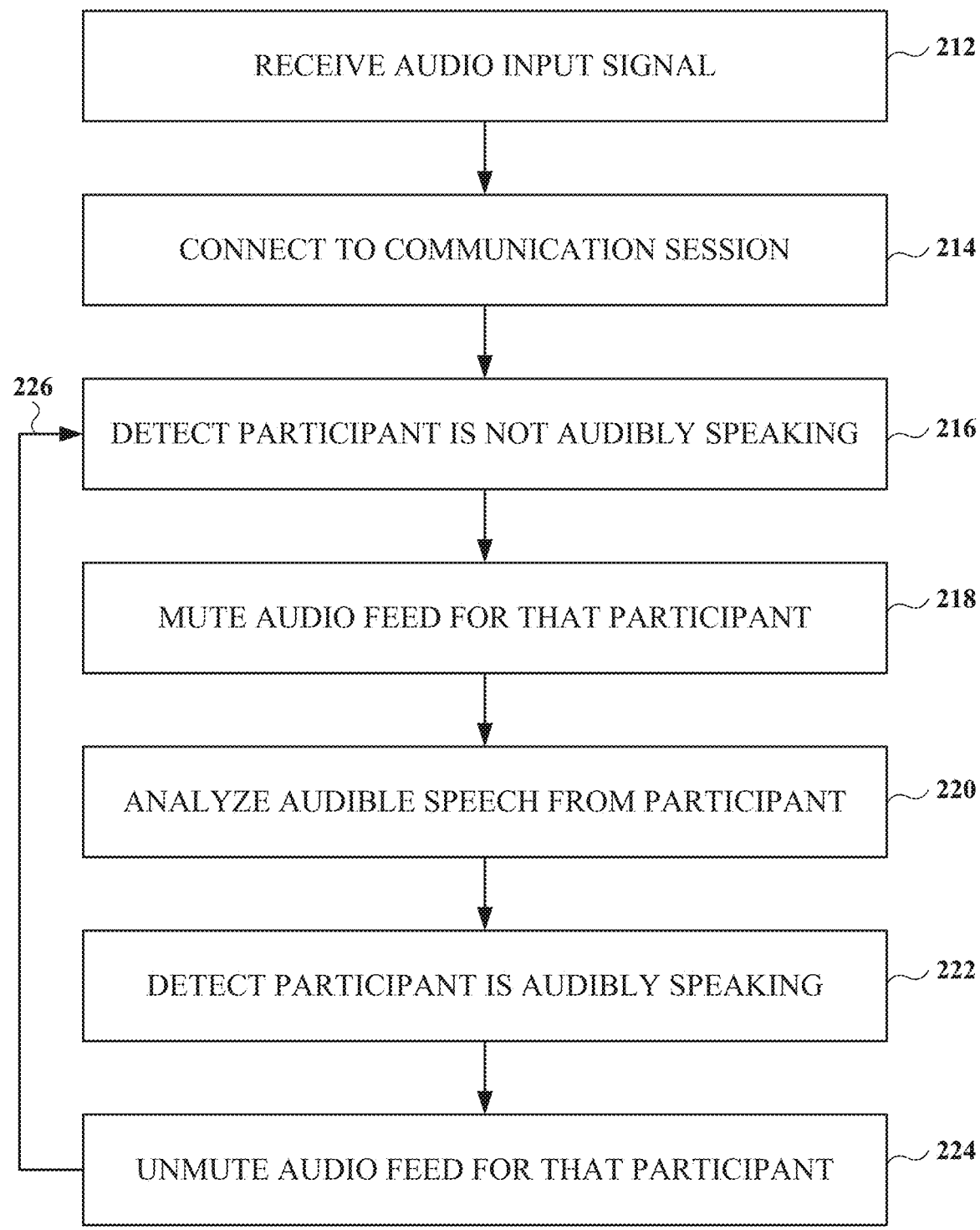
FIG. 2 is a flow chart illustrating an exemplary method that may be performed in some embodiments.

In an embodiment, the processing engine 102 may perform the exemplary method of FIG. 2 or other method herein and, as a result, provide intelligent muting and unmuting of a participant's audio feed within a communication platform. In some embodiments, this may be accomplished via communication with the user's client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein. In some embodiments, a server computer may be running one or more processing engines and/or communication platforms among a large plurality of instances of processing engines and/or communication platforms in a data center, cloud computing environment, or other mass computing environment. There also may be hundreds, thousands or millions of client devices.

The client device 150 of the user is a device configured to send and receive signals and information between the client device, processing engine 102, and communication platform 140. The client device includes a display configured to present information to a user of the device, and a means of producing an audio output (via, e.g., built-in speakers or headphones or speakers connected via an audio output jack, Bluetooth, or some other method of producing audio output). The client device 150 includes a means of capturing audio. In some embodiments, the client device also includes a means of capturing video. Audio and/or video may be captured via one or more built-in capture components, or external devices configured to capture audio and/or video and transmit them to the client device. In some embodiments, the client device presents, via the display, information in the form of a UI with multiple selectable UI elements or components.

In some embodiments, the client device is a computing device capable of hosting and executing one or more applications or other programs capable of sending and/or receiving information. In some embodiments, the client device may be a computer desktop or laptop, mobile phone, tablet computer, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the client device 150 is associated with a user account within a communication platform.

In some embodiments, the client device 150 hosts a communication application that allows the client device 150 to communicate with the processing engine 102 and communication platform 140. In an embodiment, the communication platform 140 and/or one or more databases may maintain a number of user accounts, each associated with one or more client device(s) 150 and/or one or more users of the client device(s).

Among other functions, the communication application running on a client device can capture audio and transmit it to the processing engine 102 as an input audio signal. The input audio signal is generally captured having a variety of characteristics and parameters. The input audio signal captured by the client device is converted into an audio feed to be transmitted to other participants within the communication session. In some embodiments, digital signal processing is performed on the input audio signal in the process of converting it to an audio feed within the communication session.

In some embodiments, optional repositories can include one or more of an input audio signal repository 130, audio feed repository 132, and/or participant repository 134. The optional repositories function to store and/or maintain, respectively, input audio signals from participants within the communication session, outgoing audio feeds transmitted to other participants, and participant information. The optional database(s) may also store and/or maintain any other suitable information for the processing engine 102 or communication platform 140 to perform elements of the methods and systems herein. In some embodiments, the optional database(s) can be queried by one or more components of the exemplary environment 100 (e.g., by the processing engine 102), and specific stored data in the database(s) can be retrieved.

Communication platform 140 is a platform configured to facilitate audio and/or video communication between two or more parties, such as within a conversation, audio and/or video conference or meeting, message board or forum, messaging environment (such as, e.g., a "chat room"), virtual meeting, or other form of digital communication. The communication session may be one-to-many (e.g., a speaker presenting to multiple attendees), one-to-one (e.g., two friends speaking with one another), or many-to-many (e.g., multiple participants speaking with each other in a group video setting). In some embodiments, the communication platform 140 hosts a communication session, and transmits and receives video, image, and/or audio data to and from the client device 150.

Figure 1B:
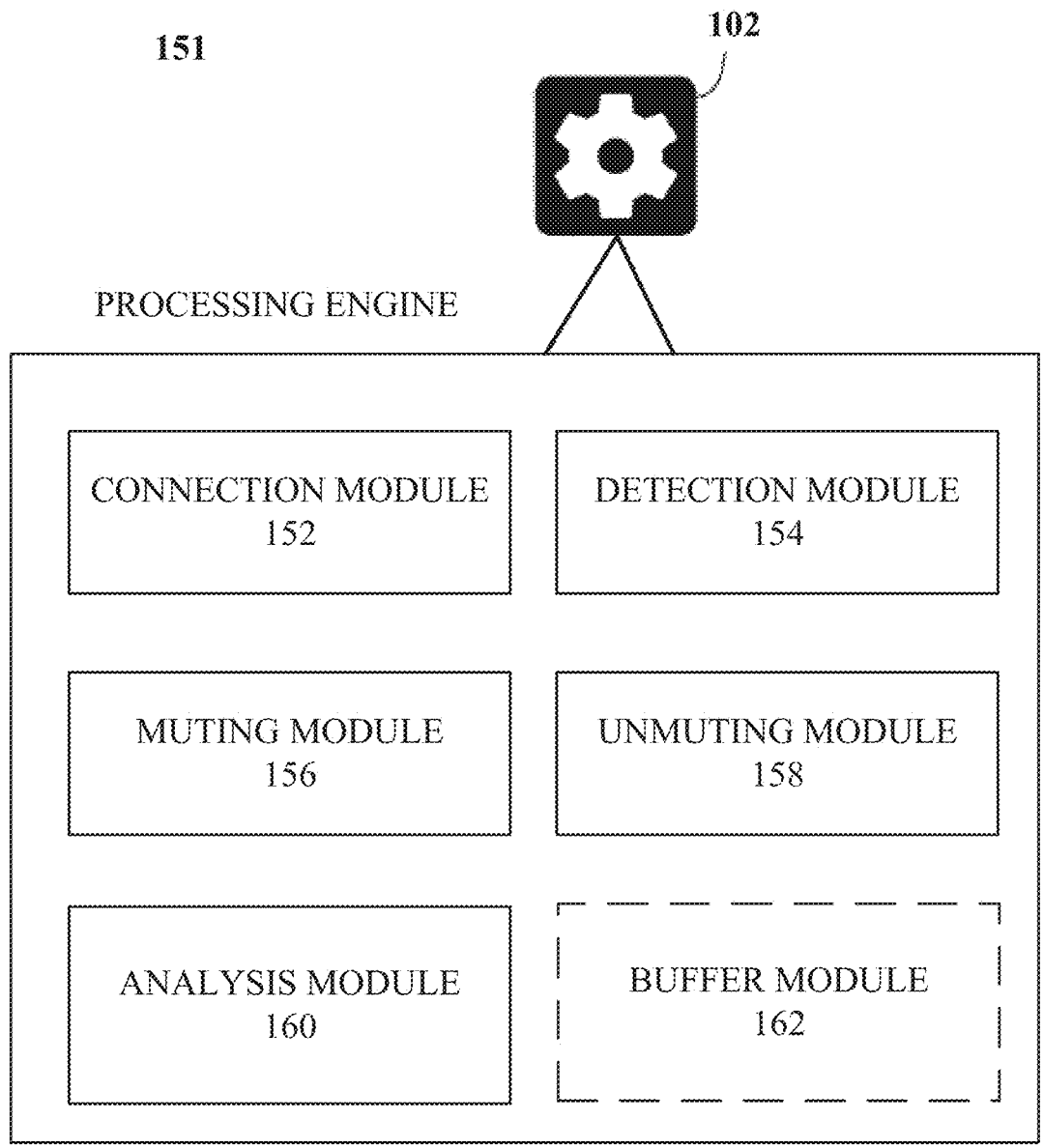
FIG. 1B is a diagram illustrating an exemplary computer system that may execute instructions to perform some of the methods herein.

FIG. 1B is a diagram illustrating an exemplary computer system 151 with software modules that may execute some of the functionality described herein.

Connection module 152 functions to receive an input audio signal from a client device, and maintain, for a participant connected to the client device, a connection to a communication session with a number of participants, where an audio feed of the participant corresponding to the input audio signal is transmitted to the rest of the participants.

Detection module 154 functions to periodically perform detection that the participant is not audibly speaking within the input audio signal, as well as detection that the participant is audibly speaking within the input audio signal.

Muting module 156 functions to mute the audio feed transmitted to the number of participants.

Unmuting module 158 functions to unmute the audio feed transmitted to the number of participants.

Analysis module 160 functions to analyze the input audio signal for audible speech from the participant.

Optional buffer module 162 functions to maintain one or more recording buffers configured to store content from input audio signals.

The above modules and their functions will be described in further detail in relation to an exemplary method below.

FIG. 2 is a flow chart illustrating an exemplary method that may be performed in some embodiments.

At step 212, the system receives an input audio signal from a client device. In some embodiments, the client device may be an audio capture device in whole or in part, or may be locally or remotely connected to an audio capture device or input audio signal repository. In some embodiments, the system receives an input audio signal by the client device transmitting the input audio signal to a processing engine 102. For example, the client device may be a smartphone which is configured to capture (i.e., record) an input audio signal via an internal microphone and transmit the captured audio signal to the processing engine 102. In some embodiments, the input audio signal is stored in cloud storage or other remote repository. In other embodiments, the input audio signal may be stored locally on the client device.

At step 214, the system maintains, for a participant connected to the client device, a connection to a communication session with a number of participants. An audio feed of the participant corresponding to the input audio signal is transmitted to the rest of the participants other than the participant connected to the client device.

In some embodiments, the system connects participants to a live communication stream via their respective client devices. The communication stream may be any "session" (such as an instance of a video conference, webinar, informal chat session, or any other suitable session) initiated and hosted via the communication platform, for remotely communicating with one or more users of the communication platform, i.e., participants within the communication session. Participants are connected on user devices, and are associated with user accounts within the communication platform.

In some embodiments, the system converts the input audio signal to an audio feed, then transmits the audio feed to a communication platform for real-time streaming. The audio feed is transmitted via the communication platform to the rest of the participants in the communication session other than the participant associated with the audio feed. In some embodiments, the communication platform is fully or partly local to a client device, while in some embodiments, the communication platform is fully or partly located on a remote server. In some embodiments, processing, conversion, and/or transmission of the input audio signal is performed in real-time or substantially real-time upon the system receiving the input audio signal. The processed audio signal can thus be heard in real-time or substantially real-time by participants of the communication session shortly after the raw audio signal is captured. Participants to the stream of audio in the communication session will thus hear the processed audio feed rather than the originally captured input audio signal.

In some embodiments, the system presents a UI for the communication session to the participant. The UI is displayed for each of a number of participants within the communication session, although different participants may be presented with slightly different or customized UIs based on their preferences or other specifics. In some embodiments, the UI includes at least a number of participant windows corresponding to the number of participants. In some embodiments, a video feed for a participant is displayed within the corresponding participant window for that participant.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, viewing a list of participants, communicating with participants via chat messaging, sharing the participant's screen with other participants, recording the video session, and more. One example of such a UI with selectable UI elements is illustrated with respect to FIG. 4.

In some embodiments, the system records at least a portion of the input audio signal. In various embodiments, the portion of the input audio signal is recorded into a buffer, cache, local storage, remote server or cloud storage, or any other suitable space for storing recordings. In various embodiments, the recording, as well as any action to initiate recording or select a portion to record, can occur before, after, or concurrently to any of step 212 through step 222.

In some embodiments, the system writes or overwrites one or more recording buffers with portions of the input audio signal. This is performed in real time during the communication session, and the writing or overwriting is done continually during the communication session. Upon the recording buffer(s) being written to capacity, the recording buffer(s) can be configured to be overwritten with portions of the input audio signal such that input audio signal is always being recorded to the buffer, regardless of its size.

In some embodiments, the recording buffer(s) are located on the local client device of each participant, such that the recording is performed locally to the client device. In other embodiments, the buffer(s) are located remotely, such as on a remote cloud data server.

In various embodiments, a recording buffer may potentially be any buffer with any possible amount of storage space allocated to that buffer. In some embodiments, the buffer is configured to record audio, while in other embodiments, the buffer may additionally or alternatively record video content including audio data which can be extracted. In some embodiments, a single buffer is used to record one or more of such media. In some embodiments, multiple buffers are used individually or in combination to record media. For example, one buffer may be used to record, and another used to record video. In some embodiments, a buffer may include time stamps or may be synced in time with the duration of the communication session.

In one example embodiment, a local buffer with 100 MB allocated to it continually records content from the input audio signal occurring during the communication session to a local client device of a participant. Upon the 100 MB capacity being reached, the buffer begins overwriting previously recorded content with input audio signal as it is being produced. The buffer continually overwrites itself with new input audio signal during the full duration of the communication session, and ends recording only once the communication session has terminated.

Steps 216 through 224 are periodically performed while the communication session is in progress and while the connection to the session is maintained by the client device. In some embodiments, one or more of steps 216 through 224 are performed concurrently to one another or in a way that overlaps in time with one another, while in some embodiments, steps 216 through 224 are performed sequentially in whole or in part. The steps can also be performed in a different order, i.e., non-sequentially.

At step 216, the system detects that the participant is not audibly speaking within the input audio signal.

In some embodiments, the system detects that the participant is not audibly speaking within the input audio signal by periodically analyzing the waveforms of the input audio signal to detect an absence representative of the participant's vocal speech. In some embodiments, a machine learning (ML) model or an artificial intelligence (AI) model may be trained to recognize the participant's specific voice, speech, and vocal patterns. In some embodiments, the training data for training such a model can come at least in part from previous recordings of the participant speaking during communication sessions. In some embodiments, such data is only used for training of an ML or AI model with the express permission from the participant.

In some embodiments, the system analyzes the waveforms of the input audio signal to detect an absence representative of the participant's vocal speech by determining a representative amplitude of the participant's vocal speech, and then detecting, within the waveforms, a decrease in amplitude proportional to the representative amplitude of the participant's vocal speech.

In some embodiments, the system detects that the participant is not audibly speaking within the input audio signal by extracting audio features from the input audio signal, then using them as input for an ML model, neural network model, or any other suitable AI model. First, the system extracts one or more audio features from the input signal's raw waveform. In various embodiments, audio features that are extracted may include, e.g., pitch along the time domain, frequency domain, and/or cepstral domain, spectral peaks and/or any harmonic relationships between them, and Mel-frequency cepstral coefficients ("MFCC"). In some embodiments, one or more features may be extracted and then a spectrogram, such as, e.g., a Mel or Log-Mel spectrogram, or a Short-Time Fourier Transform ("STFT") spectrogram may be generated based on those audio features. In some embodiments, speech features, such as phonetic features of speech may be extracted in order to distinguish the speaker from background noise which does not share the audio properties of speech. In some embodiments, the system then sends the extracted audio features to an AI model. The AI model receives the audio features, analyzes them, and outputs a probability output label of 0 or 1 based on a prediction of whether the participant's voice is audibly present in the audio or not. In some embodiments, the AI model may include a hybrid neural network consisting of a convolutional neural network ("CNN") and a multilayer perceptron ("MLP"). That is, the AI model may deploy a CNN at the input and an MLP at the output, with the output of the CNN feeding into the MLP, in order to ingest an audio signal and generate a classification prediction for it. Other embodiments may include one or more differing types of AI models or neural network architectures. For example, recurrent neural networks ("RNN") or long short-term memory ("LSTM") networks may be deployed.

At step 218, the system mutes the audio feed transmitted to the rest of the participants. In some embodiments, AI-based muting or silencing techniques for audio may be used for muting the audio feed. This may include, e.g.: deep learning-based methods, neural networks, and/or AI algorithms trained on one or more training datasets, e.g., datasets filled with samples of the participant's voice, such as past meeting recordings in which the participant spoke, as well as for example, background chatter, air conditioning, typing, dogs barking, or traffic.

In some embodiments, in response to muting the audio feed transmitted to the plurality of other participants, an alert or notification is sent to the participant at the client device or some secondary device also connecting the participant to the communication session. For example, upon the participant being muted, the participant's smartphone may vibrate once to signal the muting, or may play back a small alert sound (such as a "ping"-type sound) to signal the muting. This can inform a user as to whether they are muted without having to look at information on a UI or screen. In some embodiments, the alert or notification may be visual in nature, such as a bouncing UI element, one or more elements or windows of a UI flickering, flashing, or changing color, or any other sign of visually alerting the participant.

In some embodiments, the system detects audible speech that is not from the participant within the input audio signal, and mutes the audio feed transmitted to the plurality of other participants. This can serve the purpose of muting the participant's audio feed when unwanted background conversation or speech is audible in the participant's audio feed. Thus, the same system configured to mute the participant's voice can also mute other voices heard within the participant's audio feed.

At step 220, the system analyzes the input audio signal for audible speech from the participant. In some embodiments, this includes the system entering into a "listening state" in which it continually or periodically listens for whether audible speech from the participant can be heard within the audio feed. For example, the system may be configured to check whether the participant's voice can be heard, e.g., every 100 milliseconds, every 500 milliseconds, or every 1 second. In some embodiments, the system may determine whether audible speech from the participant can be heard based on the detected amplitude of the input audio signal increasing in general, or increasing in a way that is proportional to the expected amplitude increase of the participant's voice being heard in the audio signal. In some embodiments, an ML or other AI model can be trained to recognize the participant's specific voice, speech, and vocal patterns.

At step 222, the system detects that the participant is audibly speaking within the input audio signal.

In some embodiments, the system detects that the participant is audibly speaking within the input audio signal by recognizing that the participant has uttered a prespecified passphrase. In some embodiments, such a passphrase may be any default or selected passphrase which may be uttered to signal to the system that the participant wishes to be unmuted. For example, "unmute" may be a prespecified passphrase which the system is configured to recognize and respond to by unmuting the audio feed after the passphrase has been uttered. The other participants do not hear the participant uttering "unmute"; rather, they only hear the speech after that passphrase is provided. In some embodiments, an ML or AI model is configured to only unmute when the specific participant's vocal uttering of the passphrase is heard, and no other human voice uttering the passphrase. This enables the participant to be ensured that no one will attempt to unmute the participant against his or her will.

In some embodiments, the passphrase may be a custom passphrase which has been selected by the participant. The participant may be allowed to select, within a settings or preferences window of the UI, a passphrase to type in or speak, which is then remembered by the system as a passphrase with a specific instruction, e.g., mute, unmute, leave the session, or similar.

In some embodiments, the detection that the participant is audibly speaking includes recognizing that the participant has performed a prespecified non-verbal utterance. For example, a participant may be unmuted upon clearing his or her throat, by inhaling or exhaling deeply signaling preparation to speak, or any other suitable non-verbal utterance.

In some embodiments, the system detecting that the participant is audibly speaking within the input audio signal includes recognizing that the participant has performed a prespecified non-verbal gesture within a video feed of the participant. That is, the system can analyze the video feed of the participant being transmitted to other participants to determine whether there are any non-verbal gestures or movements which indicate that the participant is speaking. For example, if the participant's lips are moving as if the participant is talking, but the audio feed is muted, then the system can detect this and unmute the participant's audio feed automatically at the next step.

At step 224, the system unmutes the audio feed transmitted to the plurality of other participants.

In some embodiments in which a recording buffer is continually writing or overwriting with the content of the input audio signal, unmuting the audio feed transmitted to the participants can include retrieving and playing back a portion of the recording buffer comprising the participant's vocal speech. This may be, for example, a fraction of a second or less of the content prior to the system detecting that the participant is audibly speaking, so that no part of the participant beginning to speak is cut off. For example, the buffer may be only $1/8^{th}$ of a second that is continually overwritten, but that may be enough to play back the participant speaking from the beginning of the audible speech that was detected. The unmuting thus can appear to be a smooth transition which begins at the precise moment on or a few milliseconds before the participant begins speaking.

In some embodiments, in response to unmuting the audio feed transmitted to the plurality of other participants, an alert or notification is sent to the participant at the client device or some secondary device also connecting the participant to the communication session. For example, upon the participant being unmuted, the participant's smartphone may vibrate once to signal the unmuting, or may play back a small alert sound (such as a "ping"-type sound) to signal the unmuting. This can inform a user as to whether they are unmuted without having to look at information on a UI or screen.

In some embodiments, upon detecting that the participant is audibly speaking within the input audio signal, the system further determines that the audio feed is independently muted via the client device and one or more input devices. That is, the participant is at least "double muted", meaning the participant has been muted via at least two separate devices. For example, the participant may be muted directly within the UI of the communication session (i.e., a "mute"/ "unmute" button in the UI shows the participant is muted) as well as on a connected external speaker/microphone device the user is using as an input audio capture and output device (i.e., a button and its associated LED on the speaker/ microphone device indicates that the device is muted). In such an instance, the system unmutes the audio feed transmitted to the plurality of other participants by unmuting the audio feed at the client device as well as unmuting the audio feed at the one or more input devices.

In some embodiments, the system detects audible speech from the participant and one or more additional participants concurrently within the communication session. The system then determines a speaking order of the participants speaking concurrently and, based on the speaking order, mutes the audio feed of the participant transmitted to the plurality of other participants. That is, if the participant is speaking while one or more other participants are speaking, and the participant was not the first participant to begin speaking out of the speaking participants, then the participant can be automatically muted. This can help to mitigate "crosstalk" or "bleed-over" issues in various scenarios where multiple people are speaking at once, causing difficulty in participants being able to hear any individual participant clearly.

In some embodiments, whether muting or unmuting, the system does not indicate to any other participants whether the participant has been muted or unmuted. Instead, the system mutes and/or unmutes the participant without informing anyone in the UI for the communication session or otherwise that the participant is currently muted. In other embodiments, the system does provide such an indication to other participants. In some embodiments, the participant can have the option of selecting whether to indicate muting and/or unmuting to other participants within, e.g., a settings or preferences window.

At step 226, after step 224 is performed, the system returns to performing step 216 after some period of time has passed. This periodic loop of steps 216 through 224 is performed until the connection to the communication has terminated, or the participant, a host, or an administrator of the communication session has selected an option to no longer have automatic muting and unmuting performed within the communication session for that participant.

Figure 3:
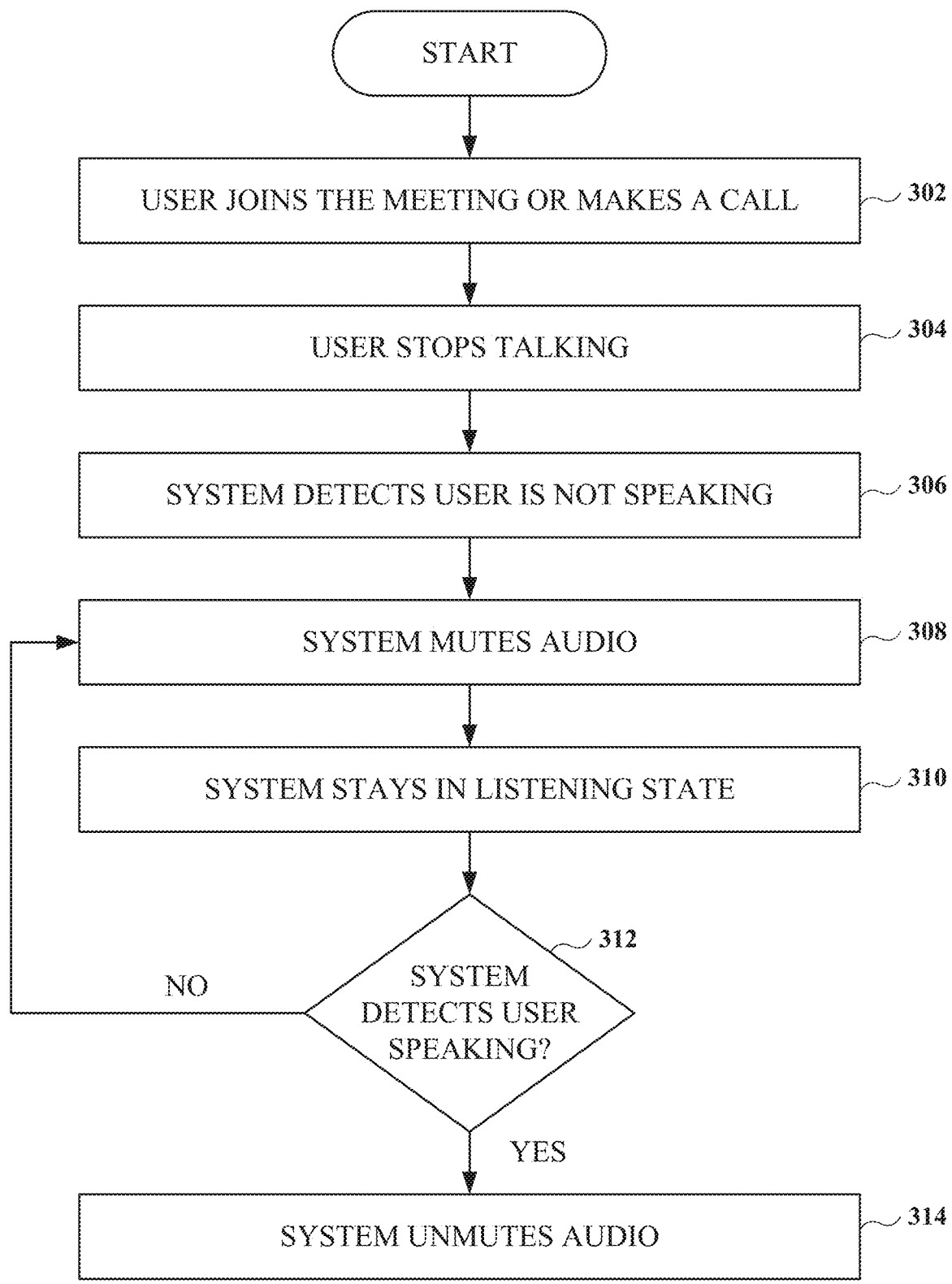
FIG. 3 is a flow chart illustrating one example embodiment of providing for the intelligent muting and unmuting of a participant's audio feed within a communication session.

FIG. 3 is a flow chart illustrating one example embodiment of providing for the intelligent muting and unmuting of a participant's audio feed within a communication session.

After the start, at step 302, a user joins a remote meeting or makes a call to attend a remote meeting. In the example, the meeting may be a video meeting, audio meeting, audio call, or any other meeting with an audio component. The user may say greetings to the other participants of the meeting. An audio feed for the user is transmitted in real time to the other participants.

At step 304, the user stops talking. At step 306, the system detects that the user is not speaking. At step 308, the system mutes the audio feed of the user that is being transmitted to other participants.

At step 310, the system stays in a listening state, periodically polling every 100 milliseconds to determine whether the user has started talking again. At decision point 312, the system either detects the user speaking, or does not. If the system does not detect the user speaking, it returns to step 308 where it continues to mute the audio and then stays in a listening state at step 310. If the system does detect the user speaking, then the system promptly unmutes the audio at step 314. In some embodiments, a continually recording buffer of the input audio signal is played back at the start of the user beginning to speak. The system then reverts to step 304 upon detecting that the user has stopped talking. Such loops from the decision point 312 to earlier in the process can continue until the meeting ends, the user leaves, the user or a host disables automatic muting and unmuting within the session, or some other triggering event occurs.

Figure 4:
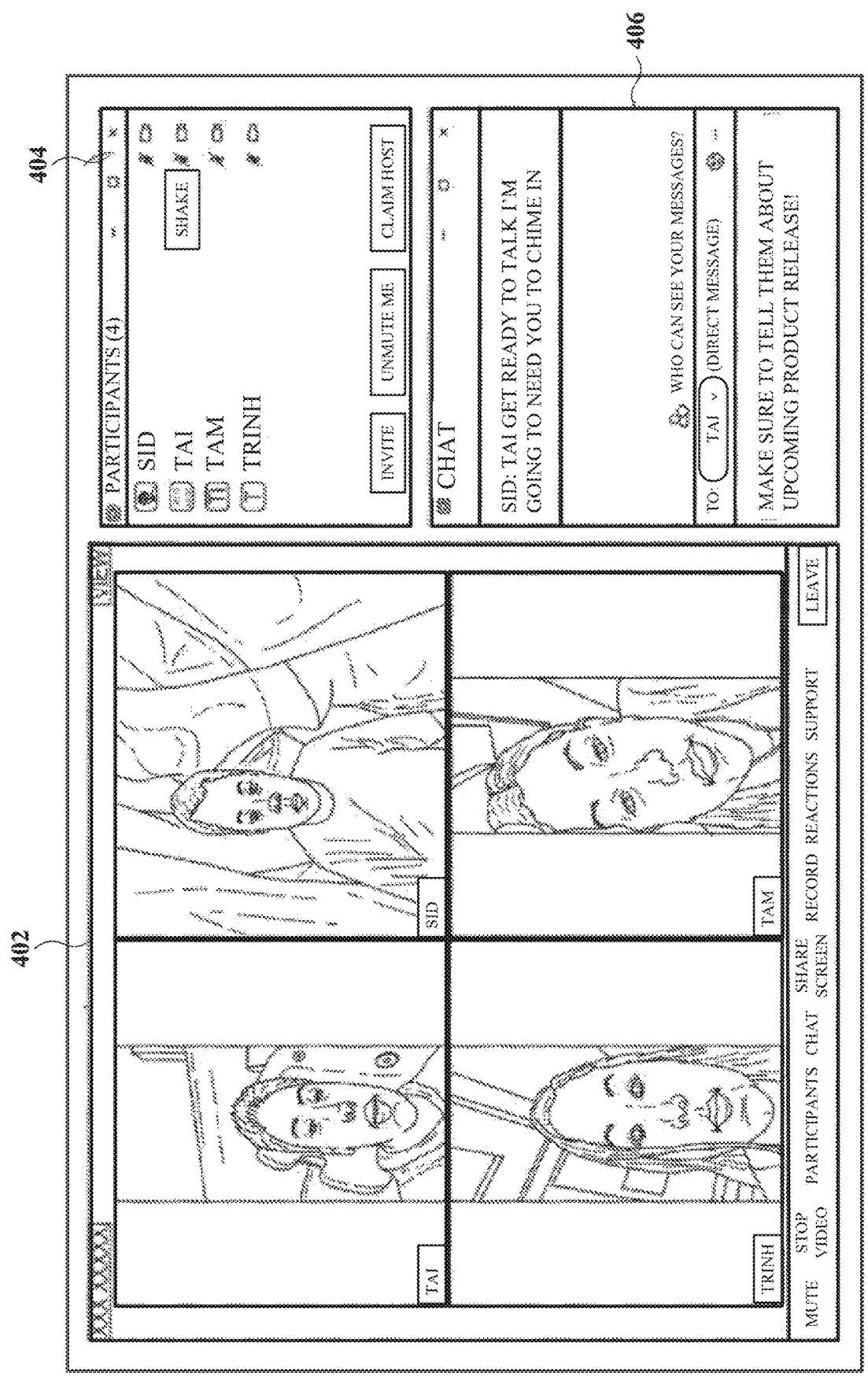
FIG. 4 is a diagram illustrating one example embodiment of a UI for a communication session wherein a participant is automatically muted and unmuted.

FIG. 4 is a diagram illustrating one example embodiment of a UI for a communication session wherein a participant is automatically muted and unmuted.

The illustration depicts a UI that a particular participant is viewing on a screen of the participant's client device. Four participant windows 402 are displayed within the UI in a grid formation. Within each participant window is a video feed. The video feed in each of the participant windows is a live video feed captured via a camera or other device that is either built into or connected to the client device of that participant, then streamed to the UIs of participants. Also appearing in the top right corner of the UI is a participant window 404 with a list of the participants to the session, which represents a list of selectable participants which the first participant can communicate with via a chat message. The participant can choose to click on the name of a participant to open up a chat window for sending a message to that participant. In the bottom right, a chat window 406 has been opened up. The participant viewing the UI has received a direct, private chat message from a first participant, reading, "Get ready to talk. I'm going to need you to chime in." A menu bar at the bottom of the UI allows the participant to mute or unmute their audio feed manually, start or stop video, see a list of participants, and perform other actions.

Upon the participant reading the chat message addressed to them encouraging them to begin talking, the participant simply begins talking, without manually selecting the mute/unmute button. Upon the participant talking, the system detects that the participant has begun audibly speaking within the input audio signal. The system unmutes the audio feed being transmitted to other participants. A recording buffer which has been continually recording a small portion of the participant's speech is played back such that the other participants hear the participant speaking from the beginning of his speech, without appearing to suddenly and abruptly hear his speech in mid-sentence or mid-word.

Figure 5:
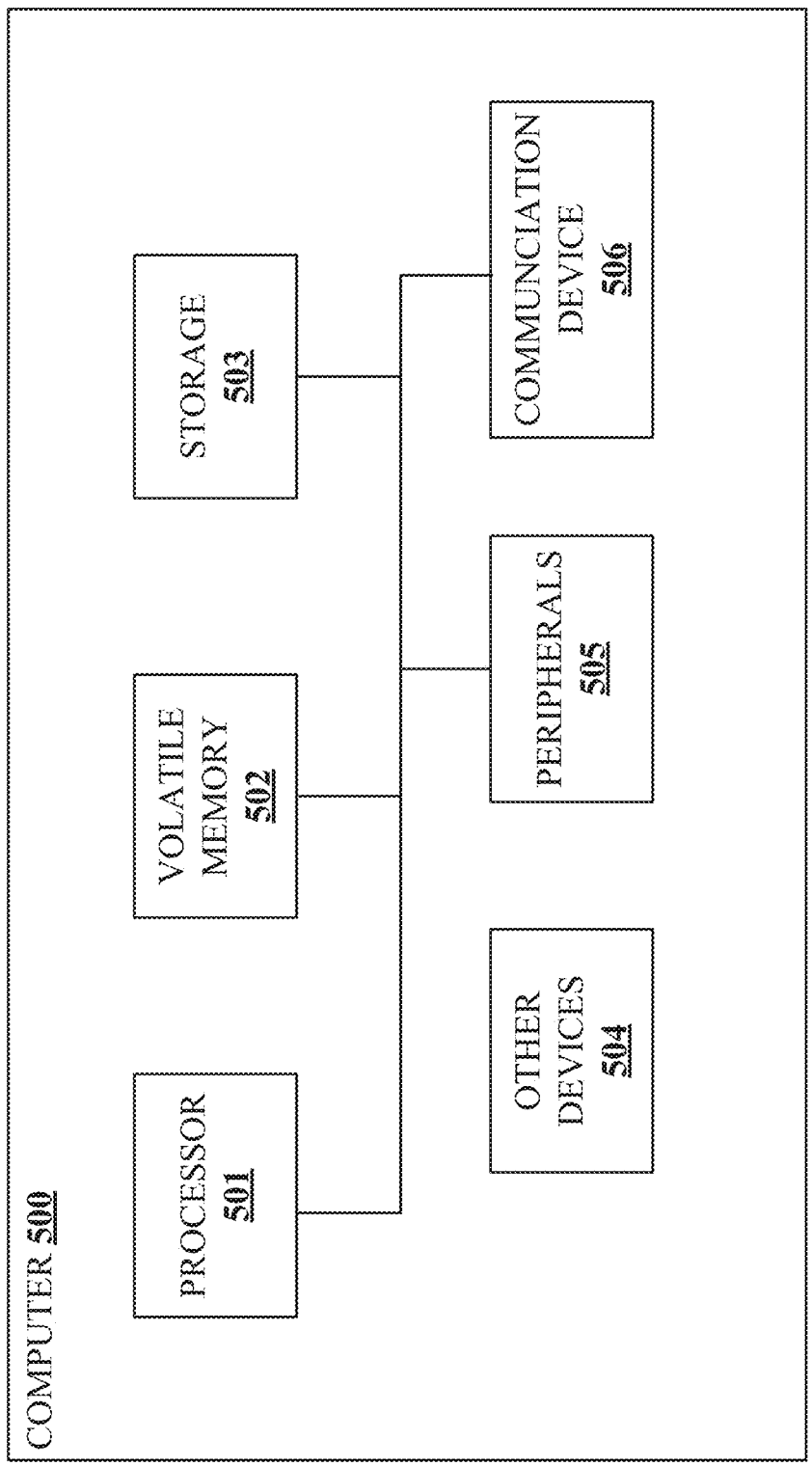
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs.

The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-Rand DVD-R recorders/players. Communications device 506 may connect the computer 500 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1. A method comprising: receiving an input audio signal from a client device; maintaining, for a participant connected to the client device, a connection to a communication session with a plurality of participants, wherein an audio feed of the participant corresponding to the input audio signal is transmitted to a plurality of other participants; and periodically performing, while the session is in progress and the connection to the session is maintained by the client device: detecting that the participant is not audibly speaking within the input audio signal; muting the audio feed transmitted to the plurality of other participants; analyzing the input audio signal for audible speech from the participant; detecting that the participant is audibly speaking within the input audio signal; and unmuting the audio feed transmitted to the plurality of other participants.

Example 2. The method of Example 1, wherein detecting that the participant is audibly speaking within the input audio signal comprises recognizing that the participant has uttered a prespecified passphrase.

Example 3. The method of any of Examples 1-2, wherein the prespecified passphrase is a custom passphrase selected by the participant.

Example 4. The method of any of Examples 1-3, wherein detecting that the participant is not audibly speaking within the input audio signal comprises periodically analyzing the waveforms of the input audio signal to detect an absence representative of the participant's vocal speech.

Example 5. The method of Example 4, wherein analyzing the waveforms of the input audio signal to detect an absence representative of the participant's vocal speech comprises: determining a representative amplitude of the participant's vocal speech, and detecting, within the waveforms, a decrease in amplitude proportional to the representative amplitude of the participant's vocal speech.

Example 6. The method of any of Examples 1-5, further comprising: training an artificial intelligence (AI) model to recognize the participant's vocal speech within an audio signal, wherein detecting that the participant is audibly speaking or not audibly speaking within the input audio signal is performed by the AI model.

Example 7. The method of any of Examples 1-6, further comprising: writing or overwriting a recording buffer with the content of the input audio signal, where unmuting the audio feed transmitted to the plurality of other participants comprises playing back a portion of the recording buffer comprising the participant's vocal speech.

Example 8. The method of any of Examples 1-7, further comprising: in response to muting the audio feed transmitted to the plurality of other participants, sending a first alert to the participant at the client device; and in response to unmuting the audio feed transmitted to the plurality of other participants, sending a second alert different from the first alert to the participant at the client device.

Example 9. The method of Example 8, wherein the first alert and the second alert each comprise one or more of: a vibration alert, an audio alert, and a visual alert.

Example 10. The method of any of Examples 1-9, further comprising: detecting audible speech that is not from the participant within the input audio signal; and muting the audio feed transmitted to the plurality of other participants.

Example 11. The method of any of Examples 1-10, further comprising: upon detecting that the participant is audibly speaking within the input audio signal, determining that the audio feed is independently muted via the client device and one or more input devices, wherein unmuting the audio feed transmitted to the plurality of other participants comprises unmuting the audio feed at the client device and the one or more input devices.

Example 12. The method of any of Examples 1-11, wherein detecting that the participant is audibly speaking within the input audio signal comprises recognizing that the participant has performed a prespecified non-verbal gesture within a video feed of the participant.

Example 13. The method of any of Examples 1-12, wherein detecting that the participant is audibly speaking within the input audio signal comprises recognizing that the participant has performed a prespecified non-verbal utterance.

Example 14. The method of any of Examples 1-13, further comprising: detecting audible speech from the participant and one or more additional participants concurrently within the communication session; determining a speaking order of the participants speaking concurrently; and based on the speaking order, muting the audio feed of the participant transmitted to the plurality of other participants.

Example 15. A communication system comprising one or more processors configured to perform the operations of: receiving an input audio signal from a client device; maintaining, for a participant connected to the client device, a connection to a communication session with a plurality of participants, wherein an audio feed of the participant corresponding to the input audio signal is transmitted to a plurality of other participants; and periodically performing, while the session is in progress and the connection to the session is maintained by the client device: detecting that the participant is not audibly speaking within the input audio signal; muting the audio feed transmitted to the plurality of other participants; analyzing the input audio signal for audible speech from the participant; detecting that the participant is audibly speaking within the input audio signal; and unmuting the audio feed transmitted to the plurality of other participants.

Example 16. The communication system of Example 15, wherein detecting that the participant is audibly speaking within the input audio signal comprises recognizing that the participant has uttered a prespecified passphrase.

Example 17. The communication system of any of Examples 15-16, wherein the prespecified passphrase is a custom passphrase selected by the participant.

Example 18. The communication system of any of Examples 15-17, wherein detecting that the participant is not audibly speaking within the input audio signal comprises periodically analyzing the waveforms of the input audio signal to detect an absence representative of the participant's vocal speech.

Example 19. The communication system of Example 18, wherein analyzing the waveforms of the input audio signal to detect an absence representative of the participant's vocal speech comprises: determining a representative amplitude of the participant's vocal speech, and detecting, within the waveforms, a decrease in amplitude proportional to the representative amplitude of the participant's vocal speech.

Example 20. The communication system of any of Examples 15-19, wherein the one or more processors are further configured to perform the operations of: training an artificial intelligence (AI) model to recognize the participant's vocal speech within an audio signal, wherein detecting that the participant is audibly speaking or not audibly speaking within the input audio signal is performed by the AI model.

Example 21. The communication system of any of Examples 15-20, wherein the one or more processors are further configured to perform the operations of: writing or overwriting a recording buffer with the content of the input audio signal, where unmuting the audio feed transmitted to the plurality of other participants comprises playing back a portion of the recording buffer comprising the participant's vocal speech.

Example 22. The communication system of any of Examples 15-21, wherein the one or more processors are further configured to perform the operations of: in response to muting the audio feed transmitted to the plurality of other participants, sending a first alert to the participant at the client device; and in response to unmuting the audio feed transmitted to the plurality of other participants, sending a second alert different from the first alert to the participant at the client device.

Example 23. The communication system of Example 22, wherein the first alert and the second alert each comprise one or more of: a vibration alert, an audio alert, and a visual alert.

Example 24. The communication system of any of Examples 15-23, wherein the one or more processors are further configured to perform the operations of: detecting audible speech that is not from the participant within the input audio signal; and muting the audio feed transmitted to the plurality of other participants.

Example 25. The communication system of any of Examples 15-24, wherein the one or more processors are further configured to perform the operations of: upon detecting that the participant is audibly speaking within the input audio signal, determining that the audio feed is independently muted via the client device and one or more input devices, wherein unmuting the audio feed transmitted to the plurality of other participants comprises unmuting the audio feed at the client device and the one or more input devices.

Example 26. The communication system of any of Examples 15-25, wherein detecting that the participant is audibly speaking within the input audio signal comprises recognizing that the participant has performed a prespecified non-verbal gesture within a video feed of the participant.

Example 27. The communication system of any of Examples 15-26, wherein detecting that the participant is audibly speaking within the input audio signal comprises recognizing that the participant has performed a prespecified non-verbal utterance.

Example 28. The communication system of any of Examples 15-27, wherein the one or more processors are further configured to perform the operations of: detecting audible speech from the participant and one or more additional participants concurrently within the communication session; determining a speaking order of the participants speaking concurrently; and based on the speaking order, muting the audio feed of the participant transmitted to the plurality of other participants.

Example 29. A non-transitory computer-readable medium containing instructions for generating a note with session content from a communication session, comprising: instructions for receiving an input audio signal from a client device; instructions for maintaining, for a participant connected to the client device, a connection to a communication session with a plurality of participants, wherein an audio feed of the participant corresponding to the input audio signal is transmitted to a plurality of other participants; and instructions for periodically performing, while the session is in progress and the connection to the session is maintained by the client device: detecting that the participant is not audibly speaking within the input audio signal; muting the audio feed transmitted to the plurality of other participants; analyzing the input audio signal for audible speech from the participant; detecting that the participant is audibly speaking within the input audio signal; and unmuting the audio feed transmitted to the plurality of other participants.

Example 30. The non-transitory computer-readable medium of Example 29, wherein detecting that the participant is audibly speaking within the input audio signal comprises recognizing that the participant has uttered a prespecified passphrase.

Example 31. The non-transitory computer-readable medium of any of Examples 29-30, wherein the prespecified passphrase is a custom passphrase selected by the participant.

Example 32. The non-transitory computer-readable medium of any of Examples 29-31, wherein detecting that the participant is not audibly speaking within the input audio signal comprises periodically analyzing the waveforms of the input audio signal to detect an absence representative of the participant's vocal speech.

Example 33. The non-transitory computer-readable medium of Example 32, wherein analyzing the waveforms of the input audio signal to detect an absence representative of the participant's vocal speech comprises: determining a representative amplitude of the participant's vocal speech, and detecting, within the waveforms, a decrease in amplitude proportional to the representative amplitude of the participant's vocal speech.

Example 34. The non-transitory computer-readable medium of any of Examples 29-33, further comprising: instructions for training an artificial intelligence (AI) model to recognize the participant's vocal speech within an audio signal, wherein detecting that the participant is audibly speaking or not audibly speaking within the input audio signal is performed by the AI model.

Example 35. The non-transitory computer-readable medium of any of Examples 29-34, further comprising: instructions for writing or overwriting a recording buffer with the content of the input audio signal, where unmuting the audio feed transmitted to the plurality of other participants comprises playing back a portion of the recording buffer comprising the participant's vocal speech.

Example 36. The non-transitory computer-readable medium of any of Examples 29-35, further comprising: in response to muting the audio feed transmitted to the plurality of other participants, instructions for sending a first alert to the participant at the client device; and in response to unmuting the audio feed transmitted to the plurality of other participants, instructions for sending a second alert different from the first alert to the participant at the client device.

Example 37. The non-transitory computer-readable medium of Example 36, wherein the first alert and the second alert each comprise one or more of: a vibration alert, an audio alert, and a visual alert.

Example 38. The non-transitory computer-readable medium of any of Examples 29-37, further comprising: instructions for detecting audible speech that is not from the participant within the input audio signal; and instructions for muting the audio feed transmitted to the plurality of other participants.

Example 39. The non-transitory computer-readable medium of any of Examples 29-38, further comprising: upon detecting that the participant is audibly speaking within the input audio signal, instructions for determining that the audio feed is independently muted via the client device and one or more input devices, wherein unmuting the audio feed transmitted to the plurality of other participants comprises unmuting the audio feed at the client device and the one or more input devices.

Example 40. The non-transitory computer-readable medium of any of Examples 29-40, wherein detecting that the participant is audibly speaking within the input audio signal comprises recognizing that the participant has performed a prespecified non-verbal gesture within a video feed of the participant.

Example 41. The non-transitory computer-readable medium of any of Examples 29-41, wherein detecting that the participant is audibly speaking within the input audio signal comprises recognizing that the participant has performed a prespecified non-verbal utterance.

Example 42. The non-transitory computer-readable medium of any of Examples 29-42, further comprising: instructions for detecting audible speech from the participant and one or more additional participants concurrently within the communication session; determining a speaking order of the participants speaking concurrently; and based on the speaking order, muting the audio feed of the participant transmitted to the plurality of other participants.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   receiving an input audio signal from a client device;
   maintaining, for the client device, a connection to a communication session with a plurality of participants, wherein an audio feed corresponding to the input audio signal is transmitted to a plurality of other participant devices; and
   while the communication session is in progress and the connection to the communication session is maintained by the client device, periodically performing:
      detecting an absence of audible speech originating at the client device within the input audio signal;
      in response to detecting the absence of the audible speech within the input audio signal, muting the audio feed transmitted to the plurality of other participant devices;
      analyzing the input audio signal for audible speech;
      detecting audible speech of the participant within the input audio signal; and
      in response to detecting the audible speech within the input audio signal, unmuting the audio feed transmitted to the plurality of other participant devices.

2. The method of claim 1, wherein detecting the absence of audible speech originating at the client device within the input audio signal comprises:
   recognizing an utterance of a prespecified passphrase.

3. The method of claim 2, wherein the prespecified passphrase is a custom passphrase selected by a participant associated with the client device.

4. The method of claim 1, wherein detecting the absence of audible speech originating at the client device within the input audio signal comprises:
   periodically analyzing waveforms of the input audio signal to detect an absence of an expected vocal speech.

5. The method of claim 4, wherein periodically analyzing the waveforms of the input audio signal to detect the absence of the expected vocal speech comprises:
   determining a representative amplitude of an expected vocal speech, and
   detecting, within the waveforms, a decrease in amplitude proportional to the representative amplitude of the expected vocal speech.

6. The method of claim 1, wherein detecting the audible speech of the participant or the absence of the audible speech within the input audio signal is performed by an artificial intelligence (AI) model trained to recognize an expected vocal speech.

7. The method of claim 1, further comprising:
   writing or overwriting a recording buffer with content from the input audio signal,
      wherein unmuting the audio feed transmitted to the plurality of other participant devices comprises:
      playing back a portion of the recording buffer.

8. The method of claim 1, further comprising:
   in response to muting the audio feed transmitted to the plurality of other participant devices, sending a first alert to a participant associated with the client device; and
   in response to unmuting the audio feed transmitted to the plurality of other participant devices, sending a second alert different from the first alert to the participant.

9. The method of claim 8, wherein the first alert and the second alert each comprises one or more of a vibration alert, an audio alert, or a visual alert.

10. The method of claim 1, further comprising:
    detecting audible that is not from the participant within the input audio signal; and
    muting the audio feed transmitted to the plurality of other participant devices.

11. The method of claim 1, further comprising:
upon detecting the audible speech of the participant within the input audio signal, determining that the audio feed is independently muted via the client device and via one or more input devices, wherein unmuting the audio feed transmitted to the plurality of other participant devices comprises:
unmuting the audio feed at the client device and the one or more input devices.

12. The method of claim 1, wherein detecting the audible speech of the participant within the input audio signal comprises:
recognizing a performance of a prespecified non-verbal gesture within a video feed originating at the client device.

13. The method of claim 1, wherein detecting the audible speech of the participant within the input audio signal comprises:
recognizing a performance a prespecified non-verbal utterance.

14. The method of claim 1, further comprising:
detecting audible speech from the client device and one or more additional participant devices concurrently within the communication session;
determining a speaking order; and
muting, based on the speaking order, the audio feed transmitted to the plurality of other participant devices.

15. A communication system comprising one or more processors configured to perform instructions to:
receive an input audio signal from a client device;
maintain, for the client device, a connection to a communication session with a plurality of participants, wherein an audio feed corresponding to the input audio signal is transmitted to a plurality of other participant devices; and
while the communication session is in progress and the connection to the communication session is maintained by the client device, periodically perform instructions to:
detect an absence of audible speech originating at the client device within the input audio signal;
in response to detecting the absence of the audible speech within the input audio signal, mute the audio feed transmitted to the plurality of other participant devices;
analyze the input audio signal for audible speech;
detect audible speech of the participant within the input audio signal; and
in response to detecting the audible speech within the input audio signal, unmute the audio feed transmitted to the plurality of other participant devices.

16. The communication system of claim 15, wherein the instructions to detect the audible speech of the participant or the absence of the audible speech within the input audio signal are performed by an artificial intelligence (AI) model trained to recognize an expected vocal speech.

17. The communication system of claim 15, wherein the one or more processors are further configured to execute instructions to:
write or overwrite a recording buffer with content from the input audio signal,
wherein to unmute the audio feed transmitted to the plurality of other participant devices comprises instructions to:
play back a portion of the recording buffer.

18. The communication system of claim 15, wherein the one or more processors are further configured to execute instructions to:
upon detecting the audible speech of the participant within the input audio signal, determine that the audio feed is independently muted via the client device and one or more input devices,
wherein to unmute the audio feed transmitted to the plurality of other participant devices comprises to:
unmute the audio feed at the client device and the one or more input devices.

19. The communication system of claim 15, wherein the one or more processors are further configured to execute instructions to:
detect audible speech from the client device and one or more additional participant devices concurrently within the communication session;
determine a speaking order; and
mute, based on the speaking order, the audio feed transmitted to the plurality of other participant devices.

20. A non-transitory computer-readable storage medium, comprising executable instructions that, when executed by a processor, facilitate performance of operations, comprising:
receiving an input audio signal from a client device;
maintaining, for the client device, a connection to a communication session with a plurality of participants, wherein an audio feed corresponding to the input audio signal is transmitted to a plurality of other participant devices; and
while the communication session is in progress and the connection to the communication session is maintained by the client device, periodically performing:
detecting an absence of audible speech originating at the client device within the input audio signal;
in response to detecting the absence of the audible speech within the input audio signal, muting the audio feed transmitted to the plurality of other participant devices;
analyzing the input audio signal for audible speech;
detecting audible speech of the participant within the input audio signal; and
in response to detecting the audible speech within the input audio signal, unmuting the audio feed transmitted to the plurality of other participant devices.

* * * * *